United States Patent
Khan et al.

(10) Patent No.: US 10,005,350 B1
(45) Date of Patent: Jun. 26, 2018

(54) TRACTION BATTERY SECURING ASSEMBLY AND METHOD

(71) Applicant: Ford Global Technologies, LLC, Dearborn, MI (US)

(72) Inventors: Ahteram Khan, Canton, MI (US); Jingmei Shen, Troy, MI (US); Ihab Grace, Grosse Pointe Woods, MI (US); Thomas A. Wagner, Ann Arbor, MI (US); Nicholas Braeseker, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/440,325

(22) Filed: Feb. 23, 2017

(51) Int. Cl.
*B60K 1/04* (2006.01)
*B60K 6/40* (2007.10)
*B60K 6/445* (2007.10)

(52) U.S. Cl.
CPC ............... *B60K 1/04* (2013.01); *B60K 6/40* (2013.01); *B60K 6/445* (2013.01); *B60K 2001/0416* (2013.01); *B60Y 2200/92* (2013.01); *B60Y 2306/01* (2013.01); *Y10S 903/951* (2013.01)

(58) Field of Classification Search
CPC .... B60K 1/04; B60K 2001/0416; B60K 6/40; B60K 6/445; B60Y 2200/92; B60Y 2306/01; Y10S 903/951
USPC ........................................................ 180/68.5
See application file for complete search history.

(56) References Cited

U.S. PATENT DOCUMENTS

| | | | |
|---|---|---|---|
| 6,637,712 B1 | 10/2003 | Lagerweij | |
| 6,648,090 B2 * | 11/2003 | Iwase | B60K 1/04 180/68.5 |
| 7,717,207 B2 * | 5/2010 | Watanabe | B60K 1/04 180/274 |
| 8,051,934 B2 | 11/2011 | Kiya et al. | |
| 8,336,657 B2 * | 12/2012 | Dobbins | B60R 25/00 180/68.5 |
| 8,393,427 B2 | 3/2013 | Rawlinson | |
| 8,550,420 B2 | 10/2013 | Wojatzki et al. | |

(Continued)

FOREIGN PATENT DOCUMENTS

| | | |
|---|---|---|
| CN | 202259493 | 5/2012 |
| CN | 105151194 | 12/2015 |

(Continued)

OTHER PUBLICATIONS

Volvo Plug-In Hybrid Crash Test Video—Battery Remains Safe—YouTube https://www.youtube.com/watch?v=veGtP8LauUc accessed Nov. 29, 2016.

*Primary Examiner* — John Daniel Walters
(74) *Attorney, Agent, or Firm* — Carlson, Gaskey & Olds, P.C.

(57) ABSTRACT

An exemplary traction battery securing assembly includes, among other things, a platform to support a battery pack, and a bracket supporting the platform in a position spaced from a vehicle structure. The bracket moves from a less elongated position to a more elongated position in response to a load to permit movement of the platform and the traction battery relative to the vehicle structure. An exemplary traction battery securing method includes, among other things, elongating a bracket in response to a load to permit a traction battery to move relative to a vehicle structure.

22 Claims, 6 Drawing Sheets

(56) References Cited

U.S. PATENT DOCUMENTS

| | | | |
|---|---|---|---|
| 8,944,401 B2 * | 2/2015 | Guest | F16F 15/08 |
| | | | 248/500 |
| 9,139,074 B2 | 9/2015 | Jarocki | |
| 9,437,853 B2 | 9/2016 | Kang et al. | |
| 9,517,686 B1 * | 12/2016 | Paramasivam | B60K 1/04 |
| 2006/0016633 A1 | 1/2006 | Fujii et al. | |
| 2016/0233468 A1 | 8/2016 | Nusier et al. | |

FOREIGN PATENT DOCUMENTS

| | | |
|---|---|---|
| CN | 205488289 | 8/2016 |
| CN | 205542942 | 8/2016 |
| CN | 106129300 | 11/2016 |
| JP | 4063098 | 3/2008 |
| JP | 2016097783 A * | 5/2016 |
| WO | 2011134828 | 11/2011 |

\* cited by examiner

TRACTION BATTERY SECURING ASSEMBLY AND METHOD

TECHNICAL FIELD

This disclosure relates generally to a securing assembly used in connection with a traction battery and, more particularly, to a securing assembly that helps keeps the traction battery connected to the vehicle structure and protected during, for example, an impact event.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage traction battery that selectively powers the electric machines and other electrical loads of the electrified vehicle. The traction battery can be packaged, for example, within a trunk or passenger compartment of the electrified vehicle. In other examples, the traction battery is packaged beneath an underbody, or packaged in some other area, of the electrified vehicle.

SUMMARY

A traction battery securing assembly according to an exemplary aspect of the present disclosure includes, among other things, a platform to support a battery pack, and a bracket supporting the platform in a position spaced from a vehicle structure. The bracket is configured to move from a less elongated position to a more elongated position in response to a load to permit movement of the platform and the traction battery relative to the vehicle structure.

In a further non-limiting embodiment of the foregoing assembly, the bracket is disposed vertically between the platform and the vehicle structure.

In a further non-limiting embodiment of any of the foregoing assemblies, the bracket includes a first section coupled to the vehicle structure, a second section coupled to the platform, and a third section extending from the first to the second section.

In a further non-limiting embodiment of any of the foregoing assemblies, the first and second sections are closer together when the bracket is in the less elongated position than when the bracket is in the more elongated position.

In a further non-limiting embodiment of any of the foregoing assemblies, the load is applied in a load direction, and the bracket is elongated in the load direction when moved from the less elongated position to the more elongated position.

In a further non-limiting embodiment of any of the foregoing assemblies the first, second, and third sections are formed together as a single unitary structure.

In a further non-limiting embodiment of any of the foregoing assemblies, the bracket comprises a first rail and a second rail slideably retained by the first rail, the second rail sliding relative to the first rail when the bracket moves from the less elongated position to the more elongated position.

In a further non-limiting embodiment of any of the foregoing assemblies, one of the first or the second rails is secured to the platform, and the other of the first of the second rails is secured to the vehicle structure.

In a further non-limiting embodiment of any of the foregoing assemblies, the load is applied in a load direction, and the second rail slides relative to the first rail in the load direction when moved from the less elongated position to the more elongated position.

In a further non-limiting embodiment of any of the foregoing assemblies, the assembly further includes the vehicle structure, wherein the vehicle structure is a floor of a vehicle trunk compartment.

A traction battery securing method according to another exemplary aspect of the present disclosure includes, among other things, elongating a bracket in response to a load to permit a traction battery to move relative to a vehicle structure.

A further non-limiting embodiment of the foregoing method includes securing a first section of the bracket to the vehicle structure and a second section of the bracket to a platform that supports the traction battery.

A further non-limiting embodiment of any of the foregoing methods includes moving the first section and the second section further apart relative to each other during the elongating.

A further non-limiting embodiment of any of the foregoing methods includes pushing the platform with a portion of an electrified vehicle to cause the elongating.

A further non-limiting embodiment of any of the foregoing methods includes using the bracket to support the battery vertically above the vehicle structure.

A further non-limiting embodiment of any of the foregoing methods includes elongating the bracket in the direction of the load.

A further non-limiting embodiment of any of the foregoing methods includes sliding a first rail of the bracket relative to a second rail of the bracket during the elongating. The second rail is slideably retained by the first rail.

In a further non-limiting embodiment of any of the foregoing methods, one of the first or the second rails is secured to a platform that supports the traction battery, and the other of the first of the second rails is secured to the vehicle structure.

In a further non-limiting embodiment of any of the foregoing methods, the vehicle structure is a floor of a vehicle truck compartment.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward securing a traction battery within an electrified vehicle using a traction battery assembly. An impact event can impart a force to the vehicle, the traction battery, or both. The traction battery securing assembly of this disclosure incorporates features that can keep the traction battery connected to a structure of the electrified vehicle as the force is applied. The traction battery securing assembly is particularly useful for traction batteries secured within impact zones of electrified vehicles.

Figure 1:
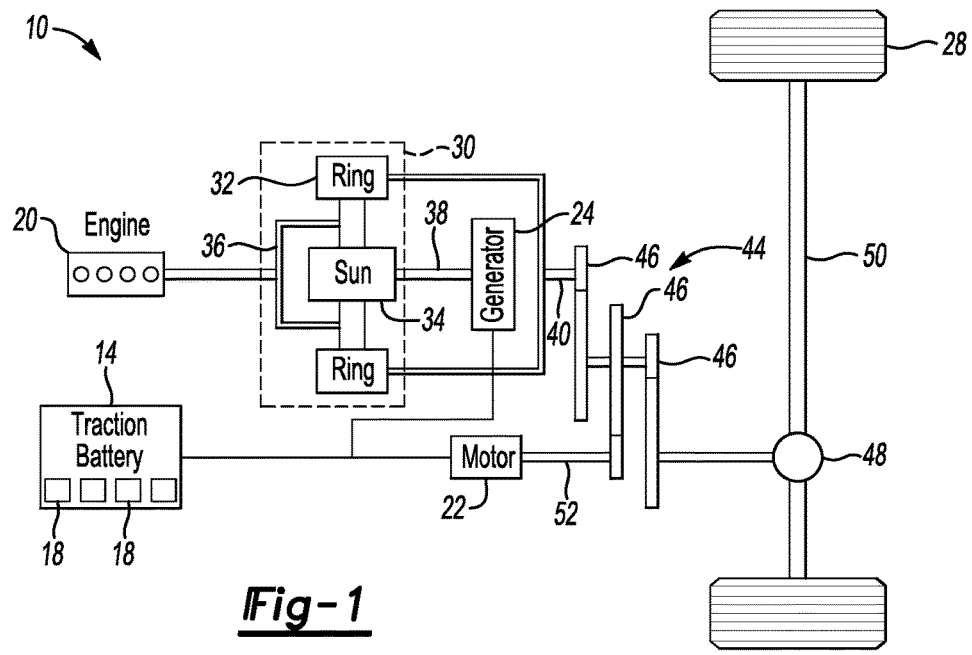
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
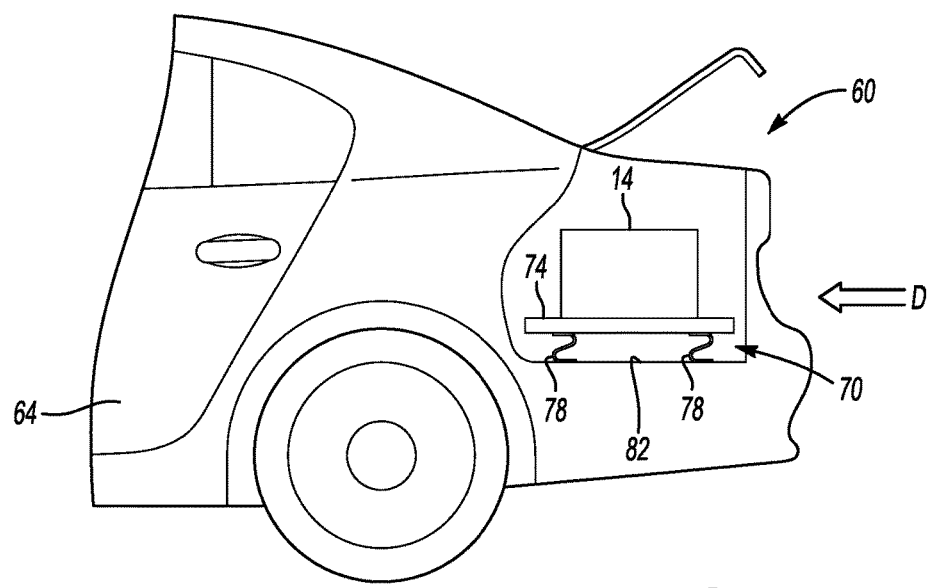
FIG. 2 illustrates a rear portion of an electrified vehicle with selected areas removed to show a traction battery of the FIG. 1 powertrain on a traction battery securing assembly within a trunk compartment.
Figure 3:
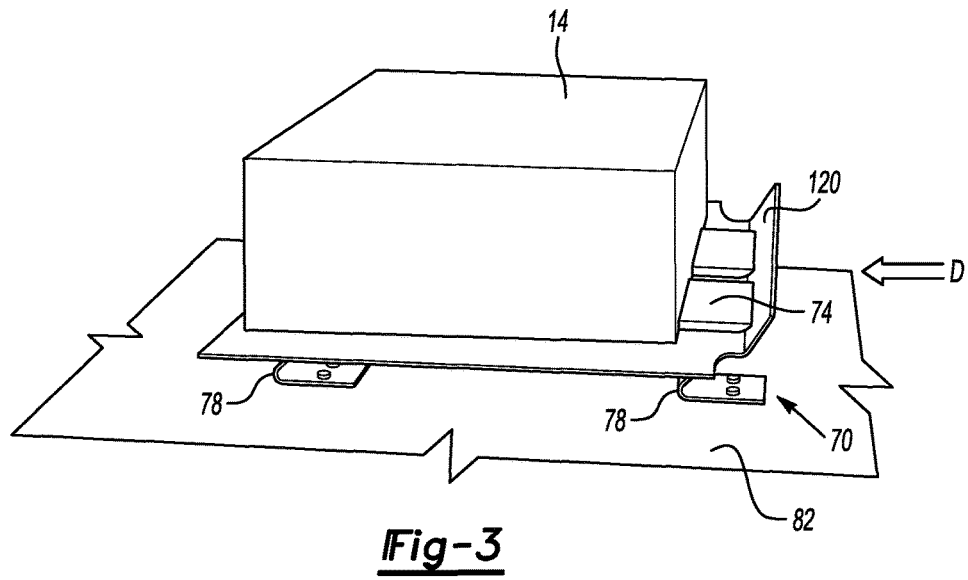
FIG. 3 illustrates a perspective view of the traction battery and traction battery securing assembly of FIG. 2 on a floor of the trunk compartment.
Figure 4:
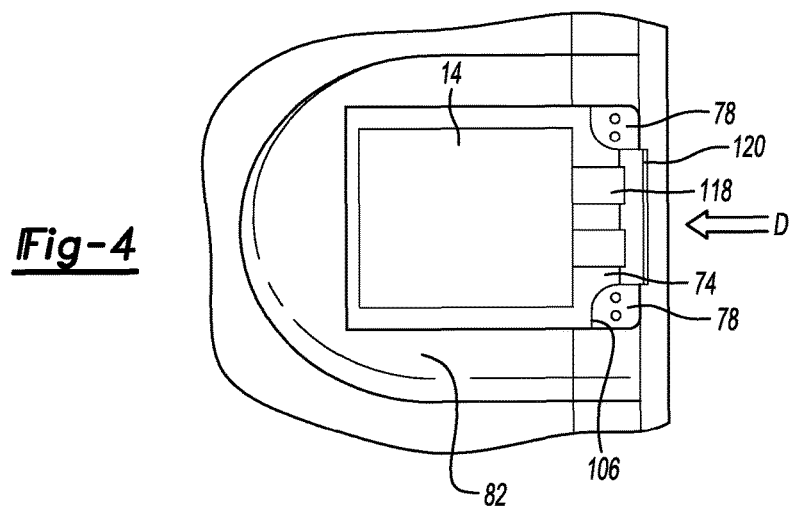
FIG. 4 illustrates a top view of the traction battery and traction battery securing assembly of FIG. 3.
Figure 5:
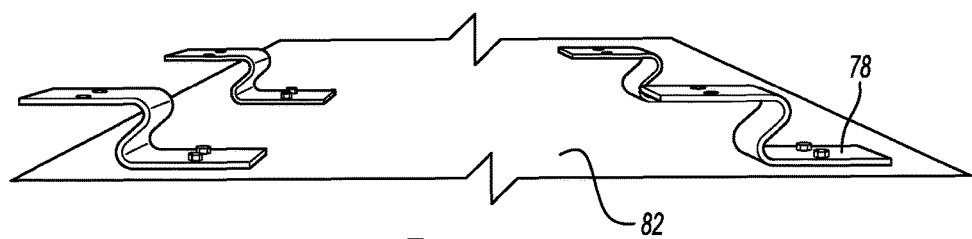
FIG. 5 illustrates a perspective view of a plurality of brackets of the traction battery securing assembly from FIG. 3.

Referring now to FIGS. 2 and 3, the traction battery 14, in an exemplary non-limiting embodiment, is positioned within a rear trunk compartment 60 of an electrified vehicle 64. A traction battery securing assembly 70 holds the traction battery 14 within the trunk compartment 60.

The traction battery 14 could be a relatively small or medium sized traction battery, such as a traction battery used within a mild hybrid electric vehicle (mHEV) or a full hybrid electric vehicle (FHEV). The traction battery 14 could instead be a relatively large sized traction battery, such as a traction battery used within a PHEV. That is, the same traction battery securing assembly 70 can be used to secure various types and sizes of traction batteries.

The traction battery securing assembly 70 includes at least a platform 74 and one or more brackets 78. The brackets 78 support the platform 74 in a position spaced from a vehicle structure 82, here a floor of the trunk compartment 60

The example brackets 78 are disposed vertically between the platform 74 and the vehicle structure 82 such that the platform 74 is spaced vertically from the vehicle structure 82. Vertical, for purposes of this disclosure, is with reference to ground that the electrified vehicle 64 is positioned upon.

The traction battery 14 can be secured directly to the platform 74 utilizing, for example, mechanical fasteners, so that the traction battery 14 substantially moves together with the platform 74. Bolt are used in one example.

Referring now to FIGS. 3 to 6, the example traction battery securing assembly 70 utilizes four brackets 78 to secure the platform 74 to the vehicle structure 82. The example brackets 78 each include a first section 90, a second section 94, and a third section 98.

The first section 90 is secured directly to the vehicle structure 82 with, for example, a mechanical fastener 102, such as a bolt that is torqued down into a threaded bore within the vehicle structure 82. The mechanical fastener 102 is outside a lowermost, rearward perimeter 106 of the platform 74. This positioning can provide access for a tool, such as a torque wrench, to engage the mechanical fastener 102.

The second section 94 of the bracket 78 is secured directly to an underside 110 of the platform 74 with, for example, a mechanical fastener 114. The second section 94 can be secured to the underside 110 of the platform 74 prior to positioning the traction battery securing assembly 70 within the trunk compartment 60.

The third section 98 extends generally along an axis A from the first section 90 to the second section 94. The axis A has both a vertical component and a horizontal component. In this example, the horizontal component is oriented toward a rear of the electrified vehicle 64 such that the third section 98 extends toward the rear of the electrified vehicle 64.

In this example, the first section 90, the second section 94, and the third section 98 of the bracket 78 are formed together as a single unitary structure. The bracket 78 could be, for example, a metal or metal alloy that is shaped and formed into the Z-shaped profile of FIG. 6.

In other examples, some or all of the first section 90, the second section 94, and the third section 98 could be formed separately and then joined together to provide the bracket 78. These sections could be joined together via a weld, for example.

Figure 6:
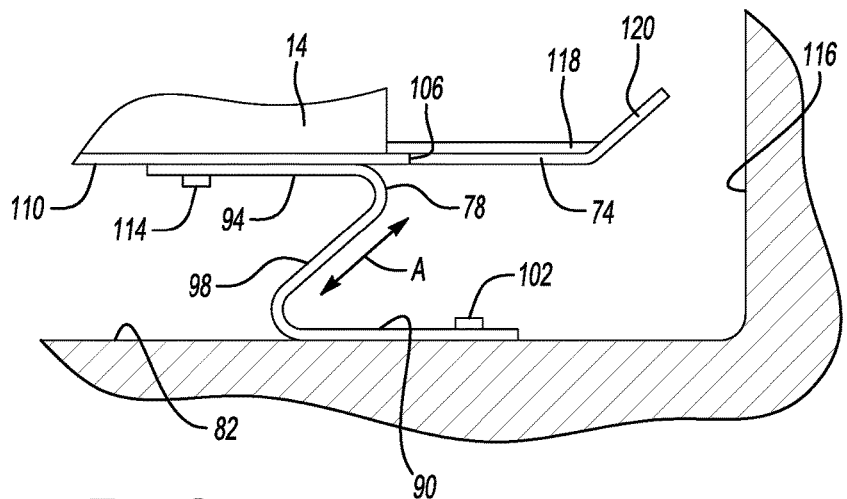
FIG. 6 illustrates a side view of one of the brackets of the traction battery securing assembly of FIG. 3 in a less elongated position.
Figure 7:
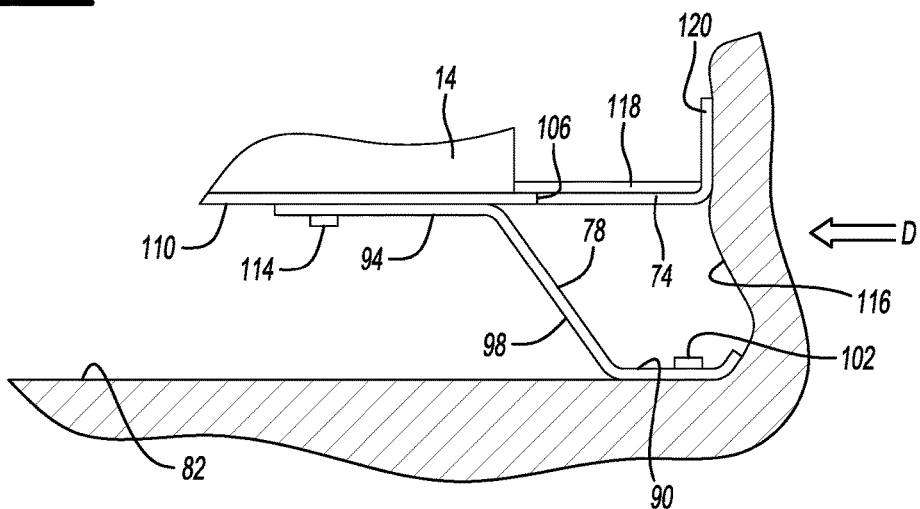
FIG. 7 illustrates the bracket of FIG. 6 in a more elongated position.

Referring now to FIG. 7 with reference to FIGS. 2 and 6, when a sufficient load is applied to the electrified vehicle 64 in a direction D, a rear end portion 116 of the electrified vehicle 64 is pushed toward the traction battery 14 and the traction battery securing assembly 70. The load could be, for example, an impact load resulting from another vehicle rear-ending the electrified vehicle 64.

The example platform 74 is formed with stiffening features 118, such as raised ridges or corrugations, and a flange 120 extending transversely from the remaining portions of the platform 74. When the load is applied in the direction D, the rear 116 of the electrified vehicle 64 moves against the stiffening features 118 and the flange 120, which pushes the platform 74 forward relative to the floor 82. Since the traction battery 14 is secured to the platform 74, the traction battery 14 moves forward with the platform 74. The stiffening features 118 and the flange 120 take the impact of the load applied in the direction D prior to the traction battery 14 and move the traction battery 14 away from the area of the impact.

The flange 120 extends upwardly in this example. In another example, the flange 120 extends downwardly. The positioning and angle of the flange 120 can be adjusted to achieve a particular movement of the remaining portions of the platform 74 and the traction battery 14 when a load is applied in the direction D. The flange 120 is sometimes position to cause the traction battery 14 to stay spaced from surrounding structures as the load is applied. That is, if an upwardly extending flange 120 would cause the rear end portion 116 of the electrified vehicle 64 to contact the traction battery 14, the flange 120 could be changed to be a downwardly extending flange. The downwardly extending flange may move the traction battery 14 in a way that keeps the traction battery 14 spaced from the rear end portion 116.

The platform 74 with the stiffening features 118 and the flange 120 is particularly appropriate if the traction battery 14 includes a polymer-based enclosure housing the battery cells. The polymer-based enclosure may benefit from the load being directed to the platform 74 rather than into the enclosure.

Although the platform 74 is described as utilizing the stiffening features 118 and the flange 120, other exemplary platforms 74 could omit the stiffening features 118, the flange 120, or both.

Movement of the platform 74 causes the second section 94 of the bracket 78 to move relative to the first section 90. This movement transitions the bracket 78 from the less elongated position of FIG. 6 to the more elongated position of FIG. 7. In the less elongated position of FIG. 6, the first section 90 and the second section 94 of the bracket 78 are closer than when the bracket 78 is in the more elongated position of FIG. 7. When the load is applied in the direction D to the rear of the electrified vehicle 64, the bracket 78 is elongated in the direction D.

The bracket 78 bends when transitioning from the less elongated position to the more elongated position. The bending helps avoid rupturing the bracket 78. The transition of the bracket 78 from the less elongated position of FIG. 6 to the more elongated position of FIG. 7 keeps the traction battery 14 secured to the vehicle structure 82 as the load is applied, which can prevent the traction battery 14 contacting undesired structures.

If the bracket 78 did not elongate, the load could cause the first section 90 to separate from the vehicle structure 82, or the second section 94 to separate from the platform 74. The bracket 78 can be designed and kinetically tuned to provide a desired amount of bend for a given load applied in the direction D.

Orienting the horizontal component of the axis A toward the rear of the electrified vehicle 64, rather than, say, a side of the electrified vehicle 64, can facilitate elongation of the bracket 78 in response to the load applied in the direction D to a rear of the electrified vehicle 64.

While the exemplary bracket 78 is configured to absorb loads applied in the direction D without rupturing, the bracket 78 would also elongate somewhat in response to a load applied in another direction, such as during a side impact.

Transitioning of the bracket 78 from the less elongated position of FIG. 6 to the more elongated position of FIG. 7 can also increase a time period over which the load is applied to the traction battery 14 through the vehicle structure 82, the bracket 78, and the platform 74. The traction battery 14 remains connected to the vehicle structure 82 even when the bracket 78 is in the more elongated position.

Figure 8:
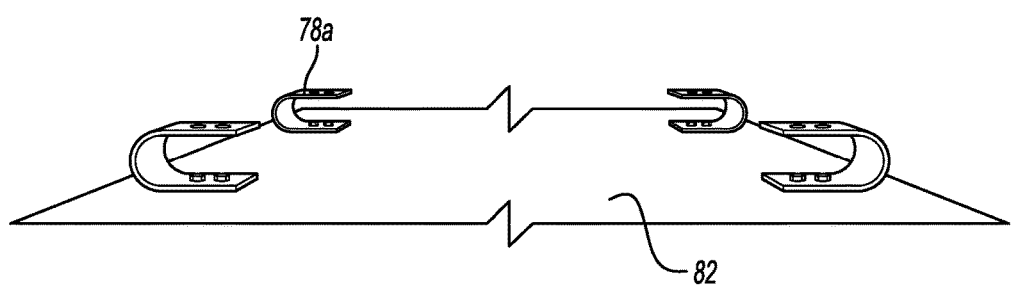
FIG. 8 illustrates a perspective view of a plurality of brackets from a traction battery securing assembly according another exemplary embodiment.
Figure 9:
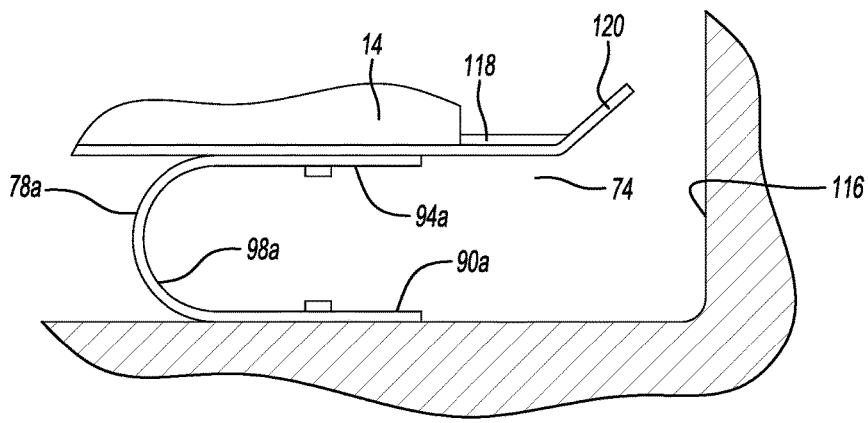
FIG. 9 illustrates a side view of one of the brackets of the traction battery securing assembly of FIG. 8 in a less elongated position.
Figure 10:
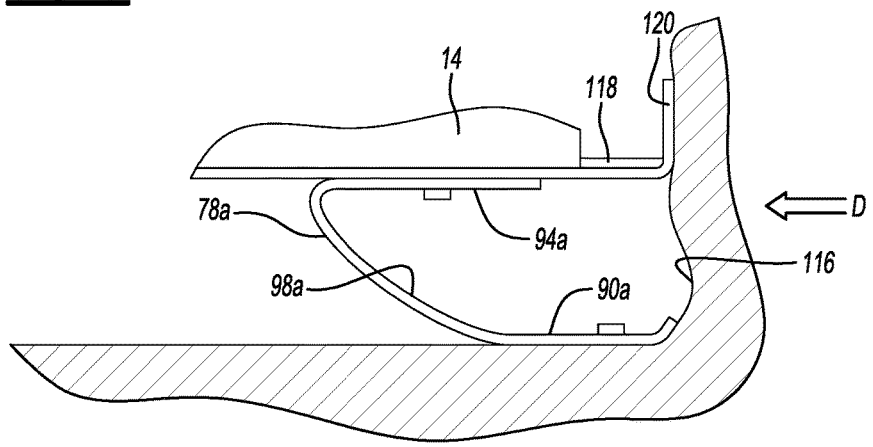
FIG. 10 illustrates the bracket of FIG. 8 in a more elongated position.
Figure 11:
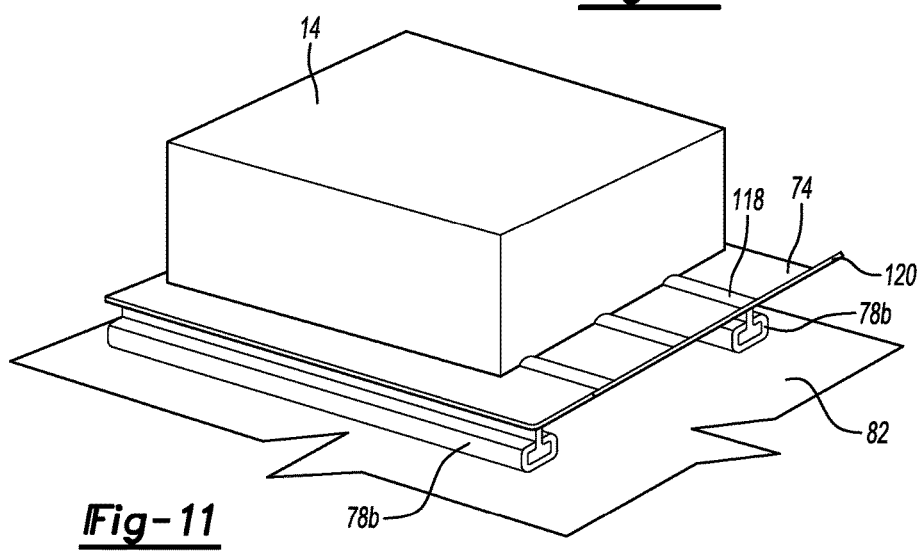
FIG. 11 illustrates a traction battery supported by a traction battery securing assembly according to yet another exemplary embodiment.
Figure 12:
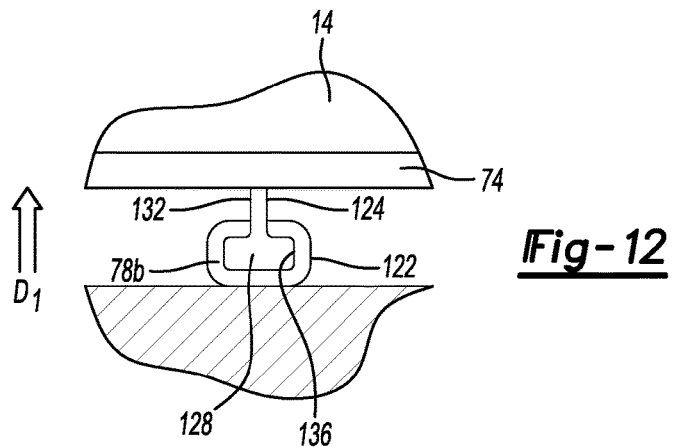
FIG. 12 illustrates an end view of one of the brackets from the traction battery securing assembly of FIG. 11.
Figure 13:
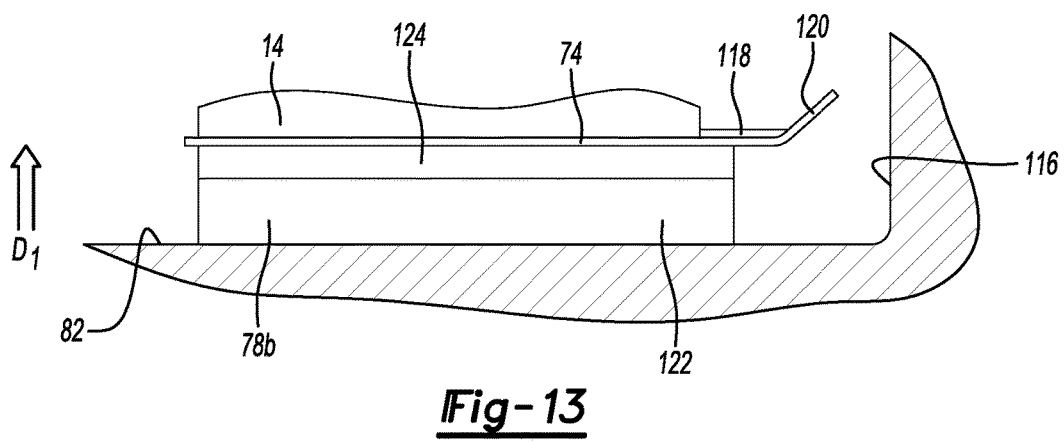
FIG. 13 illustrates the bracket of FIG. 11 in a less elongated position.
Figure 14:
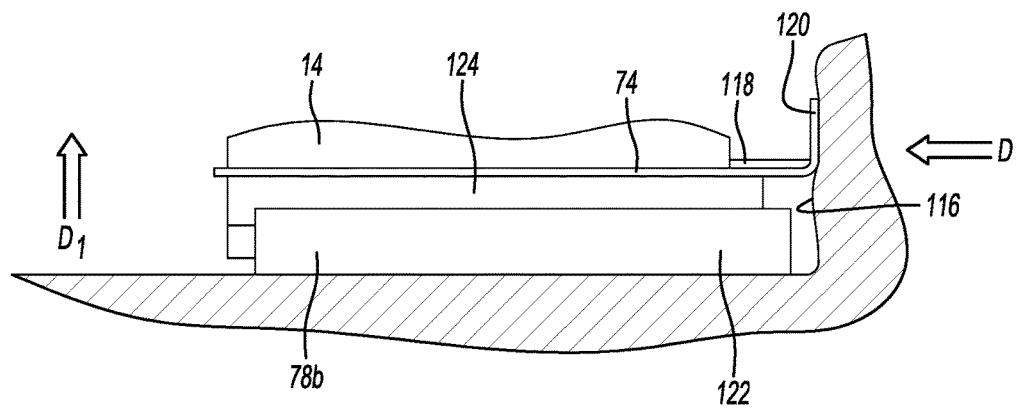
FIG. 14 illustrates the bracket of FIG. 11 in a more elongated position.

Referring now to FIGS. 8 to 10, another example bracket 78a can be used to support the platform 74 shown in FIGS. 2 and 3. The bracket 78a differs from the bracket 78 of FIGS. 6 and 7 in that the bracket 78a has a C-shaped configuration. Like the bracket 78 of FIG. 6, the brackets 78a each include a first section 90a, a second section 94a, and a third section 98a. The third sections 98a extend from respective first sections 90a to respective second sections 94a.

The bracket 78a can move from a less elongated position of FIG. 9 to a more elongated position of FIG. 10 in response to application of a load applied in the direction D. When the bracket 78a is in the more elongated position of FIG. 10, the first section 90a and the second section 94a are further from each other than when the bracket 78a is in the less elongated position of FIG. 9.

Referring now to FIGS. 11 to 14, in another example embodiment, one or more brackets 78b are used to support the platform 74 that supports the traction battery 14. The brackets 78b include a first rail 122 and a second rail 124. The first rail 122 is secured directly to the vehicle structure 82, and the second rail 124 is secured directly to the platform 74 supporting the traction battery 14.

In another example, the securing of the rails is reversed such that the first rail 122 is secured to the platform 74 and the second rail 124 is secured to the vehicle structure 82.

The second rail 124 is slideably retained within the first rail 122. That is, the second rail includes an enlarged portion 128 disposed upon a neck 132. When installed, the enlarged portion 128 resides within a groove 136 of the first rail 122. The enlarged portion 128 inhibits movement of the second rail 124 away from the vehicle structure 82 in a direction Di.

When a sufficient load is applied to the electrified vehicle 64 in the direction D, the rear 116 moves against the stiffening features 118 and the flange 120, which urges the platform 74 forward relative to the vehicle structure 82. The bracket 78b moves from the less elongated position of FIG. 13 to the more elongated position of FIG. 14 when the load is applied, which keeps the traction battery 14 secured to the vehicle structure 82.

Figure 15:
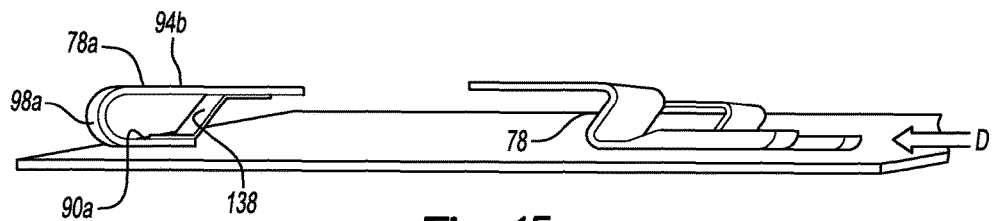
FIG. 15 illustrates a perspective view of a plurality of brackets from a traction battery securing assembly according yet another exemplary embodiment.

Referring now to FIG. 15, the various types of the exemplary brackets of this disclosure could be combined within a single traction battery securing assembly 70. The traction battery securing assembly of FIG. 15 incorporates a combination of the brackets 78 and the brackets 78a to support a platform 74.

Notably, in the example of FIG. 15, the bracket 78a includes a support flange 138 extending from the first section 90a to the second section 94b in addition to the third section 98c that also extends from the first section 90a to the second section 94b. The support flange 138 can help the bracket 78a support the weight of the traction battery 14 and the platform 74.

Figure 16:
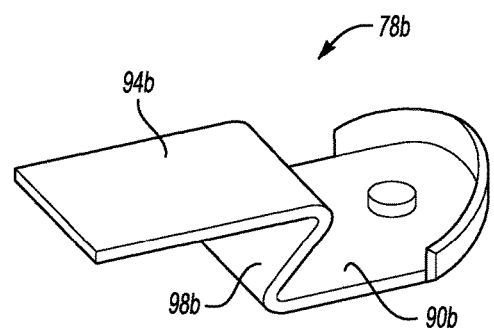
FIG. 16 illustrates a perspective view of a bracket according to yet another exemplary embodiment.

Referring to FIG. 16, another exemplary bracket 78b includes a first section 90b, a second section 94b, and a third section 98c. The first section 90b includes an upturned flange 140 facing away from the direction D. When the load is applied in the direction D, the upturned flange 140 can help to distribute the stress of the load across a larger area rather than permitting the load to concentrate on the mechanical fastener holding the first section 90b of the bracket 78b.

Referring again to FIG. 3, the example platform 74 is formed of a metal or metal alloy, such as a sheet metal. The stiffening features 118 can be formed within the platform 74 to extend longitudinally in a direction aligned with the direction D.

In another example, the platform 74 could be formed of a two-piece sheet metal understructure. The two pieces could be of different gauges, and the stiffening features 118 could be formed with a piece of a first gage and a second piece of a second gage. The stiffening features 118 of the platform 74 urge the traction battery 14 in the direction D of a load applied to the rear 116.

Figure 17:
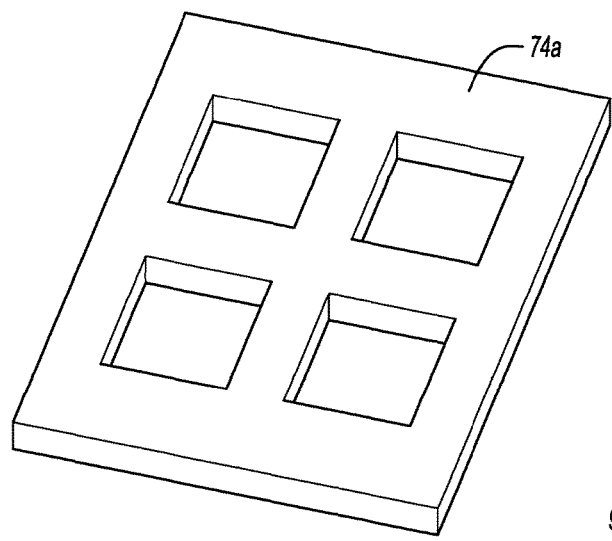
FIG. 17 illustrates a perspective view of a platform of a traction battery securing assembly according to another exemplary embodiment.

Referring now to FIG. 17, another exemplary platform 74a could be a tubular structure, rather than the sheet metal of FIG. 3. The tubular understructure of the platform 74a can be utilized to, for example, reduce a weight of the platform 74a versus the platform 74.

Figure 18:
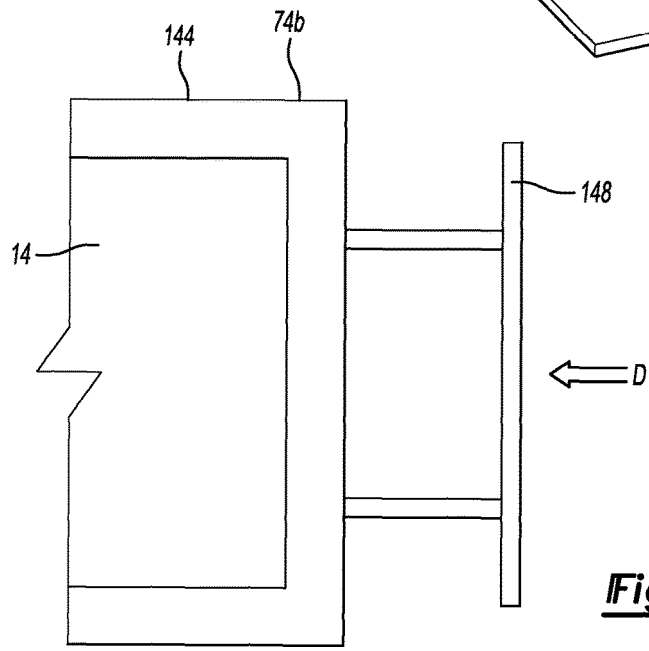
FIG. 18 illustrates a top view of a platform according to yet another exemplary embodiment.

Referring now to FIG. 18, yet another exemplary platform 74b could incorporate a portion 144 formed of a sheet metal, and another portion 148 formed of a tubular structure. In such an example, the tubular structure 148 can be used to press against the traction battery 14 in response to a load applied in a direction D.

Still other exemplary platforms could include a box-like structure that extends around the traction battery 14. Other exemplary platforms could include beams providing a stiff reinforcement that urge the traction battery 14 in the direction D upon impact.

The above examples have been disclosed in connection with a traction battery 14 positioned within the trunk compartment 60 and configured to absorb an impact load applied to the rear end portion 116 of the electrified vehicle 64. Other exemplary configurations could include traction battery support assemblies configured to absorb a side load. For example, if the traction battery 14 is positioned within the trunk compartment 60 closer to a driver side of the electrified vehicle 64 than a passenger side of the electrified vehicle 64, the brackets could be oriented to elongate in a cross car direction. Similarly, if the traction battery 14 were secured to an underside of the electrified vehicle 64, the brackets could be positioned and configured to elongate in the most likely direction for an impact.

Features of the disclosed examples include a traction battery securing assembly that can support a traction battery during an impact event while ensuring that the traction battery stays connected to a vehicle structure. As the traction battery securing assembly incorporates brackets that elongate in response to a load, the brackets are less likely to detach from the vehicle structure or a platform supporting the battery in response to a load. The traction battery is thus more likely to remain secured during an impact event.

The traction battery securing assembly can be used to secure various types of traction batteries on different vehicle platforms. That is, different vehicle platforms can use a common traction battery securing assembly, which can reduce complexity. Since the traction battery securing assembly facilitates the traction battery withstanding impact loads, more packaging locations may be possible within a given electrified vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery securing assembly, comprising:
a battery pack;
a platform to support the battery pack in a position that is vertically above the platform, the platform including a flange extending transversely from a portion of the platform that supports the battery pack, the platform further including a plurality of raised ridges disposed between the flange and the battery pack; and
a bracket having at least a portion directly beneath the platform, the bracket supporting the platform in a position vertically spaced from a vehicle structure, the bracket configured to move from a less elongated position to a more elongated position in response to a load to permit movement of the platform and the traction battery relative to the vehicle structure, the load applied to the flange of the platform.

2. The traction battery securing assembly of claim 1, wherein the bracket is disposed vertically beneath both the platform and the battery pack, and vertically between the platform and the vehicle structure, wherein the bracket is secured directly to the platform.

3. The traction battery securing assembly of claim 1, wherein the load is applied in a load direction, and the bracket is elongated in the load direction when moved from the less elongated position to the more elongated position.

4. The traction battery securing assembly of claim 1, wherein the bracket comprises a first rail and a second rail slideably retained by the first rail, the second rail sliding relative to the first rail when the bracket moves from the less elongated position to the more elongated position.

5. The traction battery securing assembly of claim 4, wherein one of the first or the second rails is secured to the platform, and the other of the first of the second rails is secured to the vehicle structure.

6. The traction battery securing assembly of claim 4, wherein the load is applied in a load direction, and the second rail slides relative to the first rail in the load direction when moved from the less elongated position to the more elongated position.

7. The traction battery securing assembly of claim 1, further comprising the vehicle structure, wherein the vehicle structure is a floor of a vehicle trunk compartment that is vertically beneath both the platform and the battery pack.

8. The traction battery securing assembly of claim 1, wherein the battery pack includes a polymer-based enclosure housing a plurality of battery cells, and the platform is formed of a metal or metal alloy.

9. The traction battery securing assembly of claim 8, wherein the platform is configured to extend rearward of the enclosure relative to a general orientation of a vehicle when the platform, the bracket, and the battery pack are installed within the vehicle, wherein the flange is disposed rearward of the portion of the platform that supports the battery pack.

10. The traction battery securing assembly of claim 1, wherein all portions of the platform are separate and distinct from all portions of the battery pack.

11. The traction battery securing assembly of claim 1, wherein the platform extends rearward of a rearmost portion of the battery pack.

12. The traction battery securing assembly of claim 11, wherein the flange is disposed rearward of the portion of the platform supporting the battery pack, and the flange extends upwardly.

13. The traction battery securing assembly of claim 1, wherein the plurality of raised ridges extend longitudinally from a position directly adjacent the battery pack to an interface between the flange and the portion of the platform.

14. The traction battery securing assembly of claim 1, wherein a portion of the load is applied to the battery pack through the raised ridges.

15. A traction battery securing method, comprising:
elongating a bracket in response to a load to permit a traction battery to move relative to a vehicle structure, the traction battery secured directly to a platform configured to move with the traction battery relative to the vehicle structure in response to the load, at least a portion of the bracket disposed directly underneath the platform and vertically between the platform and the vehicle structure, the load applied to the battery pack through a flange of the platform and a plurality of raised ridges in the platform, the flange extending transversely from a portion of the platform supporting the battery pack.

16. The traction battery securing method of claim 15, further comprising securing a first section of the bracket to the vehicle structure at a first position and a second section of the bracket to the platform at a second position, the first and second positions both directly underneath all portions of the traction battery.

17. The traction battery securing method of claim 16, further comprising moving the first section and the second section further apart relative to each other during the elongating.

18. The traction battery securing method of claim 16, further comprising pushing the flange of the platform with a portion of an electrified vehicle to cause the elongating such that the load is directed to the platform rather than into an enclosure of the traction battery that houses a plurality of battery cells.

19. The traction battery securing method of claim 15, further comprising sliding a first rail of the bracket relative to a second rail of the bracket during the elongating, the second rail slideably retained by the first rail.

20. The traction battery securing method of claim 19, wherein one of the first or the second rails is secured to a platform that supports the traction battery, and the other of the first of the second rails is secured to the vehicle structure.

21. The traction battery securing method of claim 15, wherein the raised ridges are disposed between the battery pack and the flange.

22. The traction battery securing method of claim 21, wherein the plurality of raised ridges extend longitudinally from a position directly adjacent the battery pack to the flange.

* * * * *

UNITED STATES PATENT AND TRADEMARK OFFICE
CERTIFICATE OF CORRECTION

PATENT NO. : 10,005,350 B1
APPLICATION NO. : 15/440325
DATED : June 26, 2018
INVENTOR(S) : Ahteram Khan et al.

Page 1 of 1

It is certified that error appears in the above-identified patent and that said Letters Patent is hereby corrected as shown below:

In the Claims

In Claim 15, Column 10, Line 14; after "the load applied to" replace "the battery pack" with --the traction battery--

In Claim 20, Column 10, Line 42; before "second rails" replace "the first of the" with --the first or the--

In Claim 21, Column 10, Lines 44-45; after "disposed between" replace "the battery pack" with --the traction battery--

In Claim 22, Column 10, Line 48; after "directly adjacent" replace "the battery pack" with --the traction battery--

Signed and Sealed this
Fourth Day of September, 2018

Andrei Iancu
*Director of the United States Patent and Trademark Office*